(12) United States Patent
Bartolomé Rodrigo et al.

(10) Patent No.: US 11,140,217 B2
(45) Date of Patent: Oct. 5, 2021

(54) DYNAMIC LOAD CALCULATION FOR SERVER SELECTION

(71) Applicant: Telefonaktiebolaget LM Ericsson (publ), Stockholm (SE)

(72) Inventors: Maria Cruz Bartolomé Rodrigo, Madrid (ES); Emiliano Merino Vazquez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 16/098,769

(22) PCT Filed: May 6, 2016

(86) PCT No.: PCT/EP2016/060190
§ 371 (c)(1),
(2) Date: Nov. 2, 2018

(87) PCT Pub. No.: WO2017/190798
PCT Pub. Date: Nov. 9, 2017

(65) Prior Publication Data
US 2019/0124142 A1 Apr. 25, 2019

(51) Int. Cl.
*H04L 29/08* (2006.01)
*H04L 29/12* (2006.01)
*H04L 29/06* (2006.01)

(52) U.S. Cl.
CPC ...... *H04L 67/1008* (2013.01); *H04L 61/1511* (2013.01); *H04L 67/42* (2013.01)

(58) Field of Classification Search
CPC ....... H04L 67/12; H04L 29/08; H04L 61/103; H04L 67/1008; H04L 61/1511;
(Continued)

(56) References Cited

U.S. PATENT DOCUMENTS

2005/0027862 A1 2/2005 Nguyen et al.
2011/0090146 A1* 4/2011 Katsurahira .......... G06F 3/0383
345/156
(Continued)

OTHER PUBLICATIONS

A DNS RR for Specifying the Location of Services (DNS SRV); Network Working Group; Request for Comments: 2782; Obsoletes: 2052; Category: Standards Track by A. Gulbrandsen et al.—Feb. 2000.
(Continued)

*Primary Examiner* — Tesfay Yohannes
(74) *Attorney, Agent, or Firm* — Baker Botts, LLP (57) ABSTRACT

There is provided method for managing communication in a system comprising a client entity and a plurality of servers, wherein the client entity is configured to send request messages to the servers, and wherein the servers are configured to process a request message received from the client entity and send to the client entity a response message as a result of processing said request message, the method comprising the steps of: sending, by the client entity, a request message to one of the plurality of servers for processing by the server; computing, by the server receiving the request message, an indicator for a processing load of the server, and including information relating to said indicator into the response message; sending, by the server, the response message to the client entity; storing, by the client entity, said information relating to said indicator; selecting, by the client entity, a server from said plurality of servers for sending a further request message to one of the plurality of servers, wherein said selecting is made at least on the basis of the stored information relating to one or more indicators for the processing load of one or more of the plurality of servers.

11 Claims, 8 Drawing Sheets

(58) Field of Classification Search
CPC . H04L 67/42; G06F 15/16; G06F 8/65; G06F 11/2069
USPC .................................................. 709/219, 226
See application file for complete search history.

(56) References Cited

U.S. PATENT DOCUMENTS

| | | | |
|---|---|---|---|
| 2011/0199906 A1* | 8/2011 | Kanode | H04L 45/34 370/235 |
| 2017/0075659 A1* | 3/2017 | Warren | G06F 8/31 |
| 2017/0346853 A1* | 11/2017 | Wyatt | H04L 9/3265 |
| 2018/0027035 A1* | 1/2018 | Do | H04L 65/4084 709/219 |
| 2018/0091484 A1* | 3/2018 | Atta | H04L 9/3247 |
| 2018/0095794 A1* | 4/2018 | Elmahdy | G06F 9/505 |
| 2018/0114030 A1* | 4/2018 | Sullivan | H04L 9/3226 |
| 2018/0204078 A1* | 7/2018 | Seng | B60W 50/16 |
| 2018/0288114 A1* | 10/2018 | Liu | H04L 65/80 |
| 2018/0302281 A1* | 10/2018 | Khan | H04L 67/34 |
| 2018/0338015 A1* | 11/2018 | Wang | G06F 16/9574 |
| 2019/0139063 A1* | 5/2019 | Lamm | G06F 16/9535 |
| 2019/0147007 A1* | 5/2019 | Howell | G06F 16/958 709/203 |
| 2019/0205164 A1* | 7/2019 | Kumar | G06F 9/5083 |
| 2019/0239170 A1* | 8/2019 | Thangarasa | H04W 52/365 |
| 2020/0067314 A1* | 2/2020 | Metcalfe | H02J 3/18 |
| 2020/0074009 A1* | 3/2020 | Marzorati | H04L 67/02 |

OTHER PUBLICATIONS

Diameter Load Information Conveyance; Internet Engineering Task Force; Internet-Draft; Intended status: Informational; Expires: Apr. 14, 2016 by B. Campbell et al.—Oct. 12, 2015.
Diameter Overload Indication Conveyance; Internet Engineering Task Force (IETF); Request for Comments: 7683; Category: Standards Track; ISSN: 2070-1721 by J. Korhonen, Ed., et al.—Oct. 2015.
PCT International Search Report for International application No. PCT/EP2016/060190—dated Jan. 24, 2017.
PCT Written Opinion of the International Searching Authority for International application No. PCT/EP2016/060190—dated Jan. 24, 2017.

* cited by examiner

DYNAMIC LOAD CALCULATION FOR SERVER SELECTION

PRIORITY

This nonprovisional application is a U.S. National Stage Filing under 35 U.S.C. § 371 of International Patent Application Serial No. PCT/EP2016/060190 filed May 6, 2016 and entitled "DYNAMIC LOAD CALCULATION FOR SERVER SELECTION" which is hereby incorporated by reference in its entirety.

TECHNICAL FIELD

The present invention relates to a method for managing communication in a system comprising a client entity and a plurality of servers. The present invention likewise relates to a system for performing the method for managing communication. The present invention also relates to corresponding computer programs and computer program products.

BACKGROUND

Nowadays, a communication network may serve hundreds of thousands of concurrent requests from users or clients. In order to manage such high-traffic communications, modern networks rely on multiple servers. Accordingly, a communication network typically contains a plurality of clients and a plurality of servers. Each client may contact one or more of a plurality of servers in order to obtain the required content and services. Namely, same content and services may be distributed on a pool of servers and the client may contact a specific server comprised in the pool in order to obtain a desired content or make use of a desired service. When the network is deployed with a pool of servers which are all able to manage the same requests, it is advantageous for the client to connect to the most appropriate server, for example a server that offers the best response time.

For this purpose, the client may apply a load balancing algorithm to select the best server. Load balancing is a networking method for distributing incoming requests among servers hosting the same content or services.

In the conventional art, the client may select a server from a plurality of servers on the basis of information about a processing capacity of the servers. The processing capacity is a static value, which indicates the capability of the server to process requests from clients. The static capacity, however, may vary due to a change in the internal configuration of the server. For example, in the case a processor comprised in the server may get out of service, the static capacity may vary. The processing capacity may be periodically retrieved by the client from a DNS (Domain Name System).

Accordingly, despite the availability of load balancing solutions, there remains the need for improving the distribution of the clients' requests among the servers in the pool.

An object of the present invention is therefore to provide improved concepts for efficiently balancing the load among the plurality of servers.

SUMMARY

The above mentioned problems and drawbacks of the prior art are solved by the subject matter of the independent claims. Further preferred embodiments are described in the dependent claims.

According to an aspect of the present invention, there is provided a method for managing communication in a system comprising a client entity and a plurality of servers, wherein the client entity is configured to send request messages to the servers, and wherein the servers are configured to process a request message received from the client entity and send to the client entity a response message as a result of processing said request message, the method comprising the steps of: sending, by the client entity, a request message to one of the plurality of servers for processing by the server; computing, by the server receiving the request message, an indicator for a processing load of the server, and including information relating to said indicator into the response message; sending, by the server, the response message to the client entity; storing, by the client entity, said information relating to said indicator; selecting, by the client entity, a server from said plurality of servers for sending a further request message to one of the plurality of servers, wherein said selecting is made at least on the basis of the stored information relating to one or more indicators for the processing load of one or more of the plurality of servers.

According to another aspect of the present invention, there is provided a system comprising a client entity and a plurality of servers, wherein the client entity is configured to send request messages to the servers, and wherein the servers are configured to process a request message received from the client entity and send to the client entity a response message as a result of processing said request message, and wherein: the client entity is further configured to send a request message to one of the plurality of servers for processing by the server, to receive a response message from the server receiving the request message, to store said information relating to an indicator for a processing load of the server, and to select a server from said plurality of servers for sending a further request message to one of the plurality of servers, wherein said selection is made at least on the basis of the stored information relating to one or more indicators for the processing load of one or more of the plurality of servers; and the server is configured to receive, from the client entity, the request message for processing by the server, to compute said indicator, to include information relating to said indicator into the response message, and to send the response message to the client entity.

According to another aspect of the present invention, there is provided a client entity in a system comprising a plurality of servers, the client entity comprising: sending unit configured to send a request message to one of the plurality of servers for processing by the server; receiving unit configured to receive a response message from the server receiving the request message; storing unit configured to store said information relating to an indicator for a processing load of said server; selecting unit configured to select a server from said plurality of servers for sending a further request message to one of the plurality of servers; wherein said selection is made at least on the basis of the stored information relating to one or more indicators for the processing load of one or more of the plurality of servers.

According to another aspect of the present invention, there is provided a server in a system comprising a client entity and a plurality of servers, the server comprising: receiving unit configured to receive, from the client entity, a request message for processing by the server; computing unit configured to compute an indicator for a processing load of the server; including unit configured to include information relating to said indicator into a response message; and sending unit configured to send the response message to the client entity.

According to another aspect of the present invention, there is provided a computer program comprising code, wherein the code, when executed on processing resources, instructs said processing resources to perform a method embodiment according to the present invention.

According to yet another aspect of the present invention, there is provided a computer program product that stores a code, wherein the code, when executed on processing resources, instructs said processing resources to perform a method embodiment of the present invention.

BRIEF DESCRIPTION OF THE DRAWINGS

Embodiments of the present invention, which are presented for better understanding the inventive concepts but which are not to be seen as limiting the invention, will now be described with reference to the figures in which.

DETAILED DESCRIPTION

Figure 1:
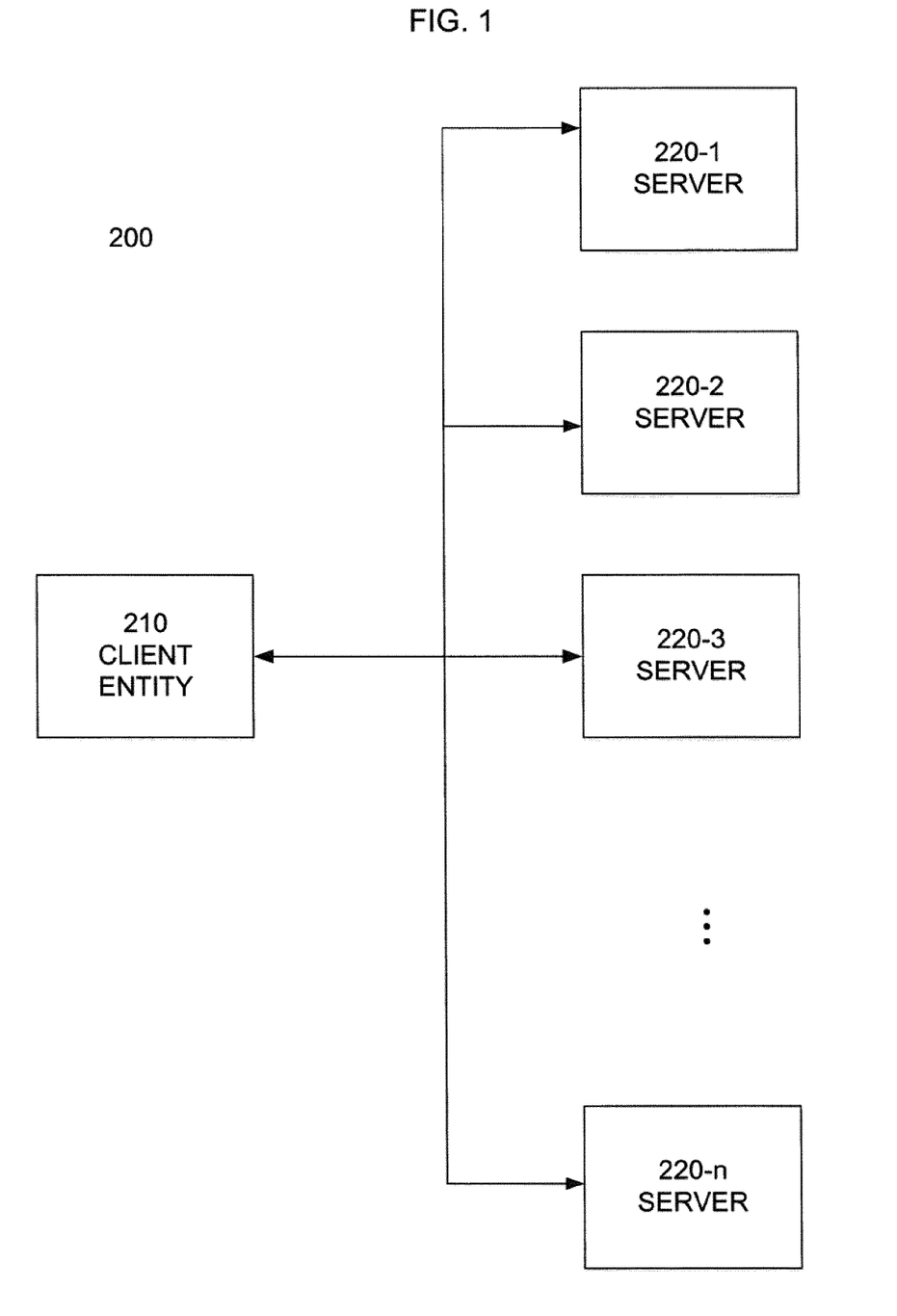
FIG. 1 shows a schematic overview of a system for managing communication according to an embodiment of the invention.

FIG. 1 shows a schematic overview of an exemplary system according to the present invention. Said system 200 comprises a client entity 210 and a plurality of servers 220-1 to 220-n. In one example, the system may be a telecommunication system where the client entity is, for instance, an MME/SGSN (Mobility Management Element/Serving GPRS Support Node) and each server of the plurality may be an HSS (Home Subscriber Server), or a HSS Front-End (HSS-FE) server.

In particular, an HSS server is a kind of subscriber data server that is intended to store, in a permanent basis, user data information in respect to a plurality of users (e.g. users being subscribers of a certain telecom network), and to receive, process, and further respond, to request messages received from a plurality of clients for, either or both: obtain user data, or modifying user data. In particular, an HSS-FE server may differ from an HSS server in that the HSS-FE server does not store in a permanent basis the user/subscriber data, but that it utilizes a further database (e.g. centralized or distributed) to obtain and/or modify the corresponding user/subscriber data due to the processing of the request messages received from the clients. Embodiments as described in conjunction with the present disclosure, however, may be independent from any specific features and characteristics of the servers. Consequently, the examples as part of the present disclosure that refer to an HSS server can thus be equally extended to an HSS-FE server. In a sense, the terms "HSS (server)" and "HSS-FE (server)" can thus be understood as equivalents.

The client entity is configured to send request messages to the servers, and the servers may be configured to process a request message received from the client entity and send to the client entity a response message as a result of processing said request message.

For instance, a UE (User Equipment) may send location requests, via radio interfaces, to the so-called serving nodes, i.e. MME/SGSN, that are responsible to keep the location of the UE. Then, the location update is provided from MME/SGSN to the HSS, that is responsible to keep the user data (profile to access and to use different services). The HSS is normally deployed in a pool, i.e. multiple HSSs are able to manage same requests.

Figure 5:
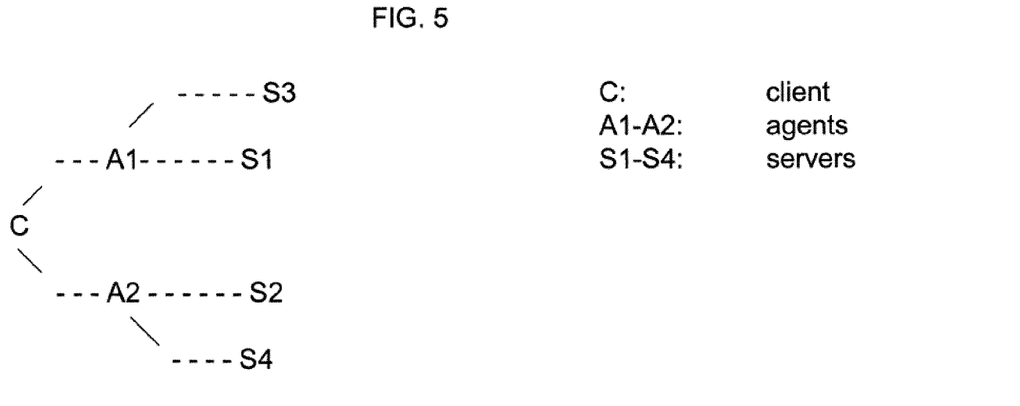
FIG. 5 shows a schematic overview of an exemplary network deployment in some operator's networks for dealing with diameter traffic.
Figure 6:
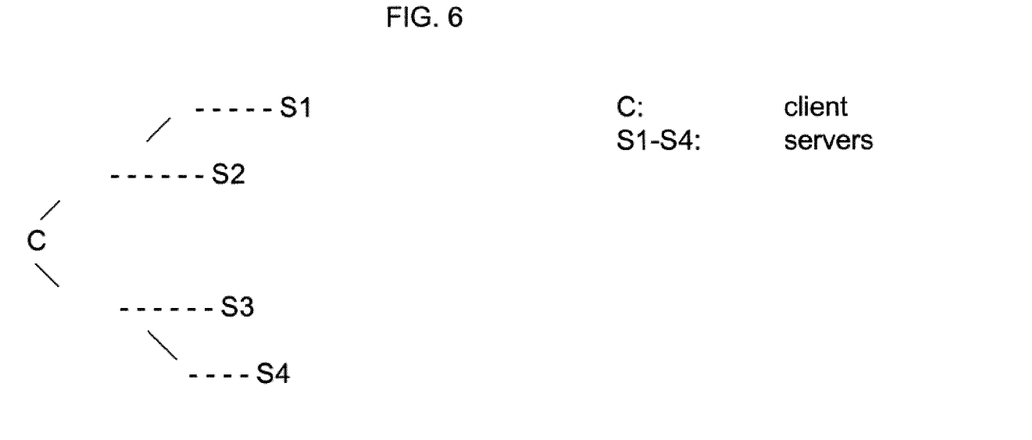
FIG. 6 shows a schematic overview of another exemplary network deployment for dealing with diameter traffic.
Figure 7:
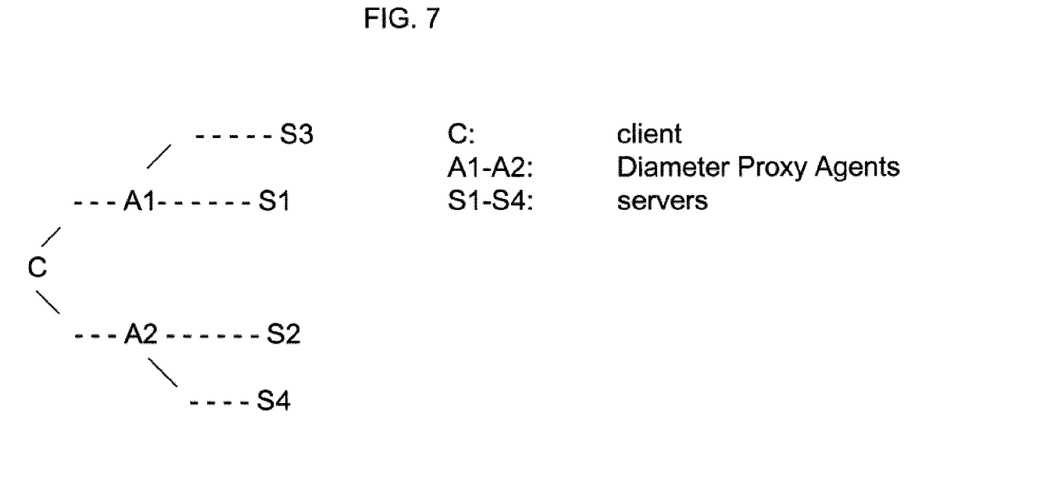
FIG. 7 shows another schematic overview of an exemplary network deployment for dealing with diameter traffic.

FIG. 1 shows a client-server scenario, where the client entity may pick directly from a set of candidate servers available for a particular realm and application, namely the client entity communicates directly with the plurality of servers. However, according to another example, as shown in FIGS. 5-7, the system may further comprise agents, or intermediate routing elements, which may be interposed between the client entity and the plurality of servers. There might be a single agent or multiple agents. In the case of diameter traffic, these routing elements may be diameter Proxy Agents and the system may be configured as in FIG. 7.

In the diameter case, every host which implements the diameter protocol may act as either a client or a server depending on network deployment. So a diameter node may be a client, a server, or an agent.

In one example, the client may receive a user connection request. After collecting user credentials, such as username and password, it may send an access request message to one of the plurality of servers. Such server may authenticate the user based on the information provided. If the authentication process succeeds, the user's access privileges may be included in the response message and send back to the corresponding client.

Figure 2:
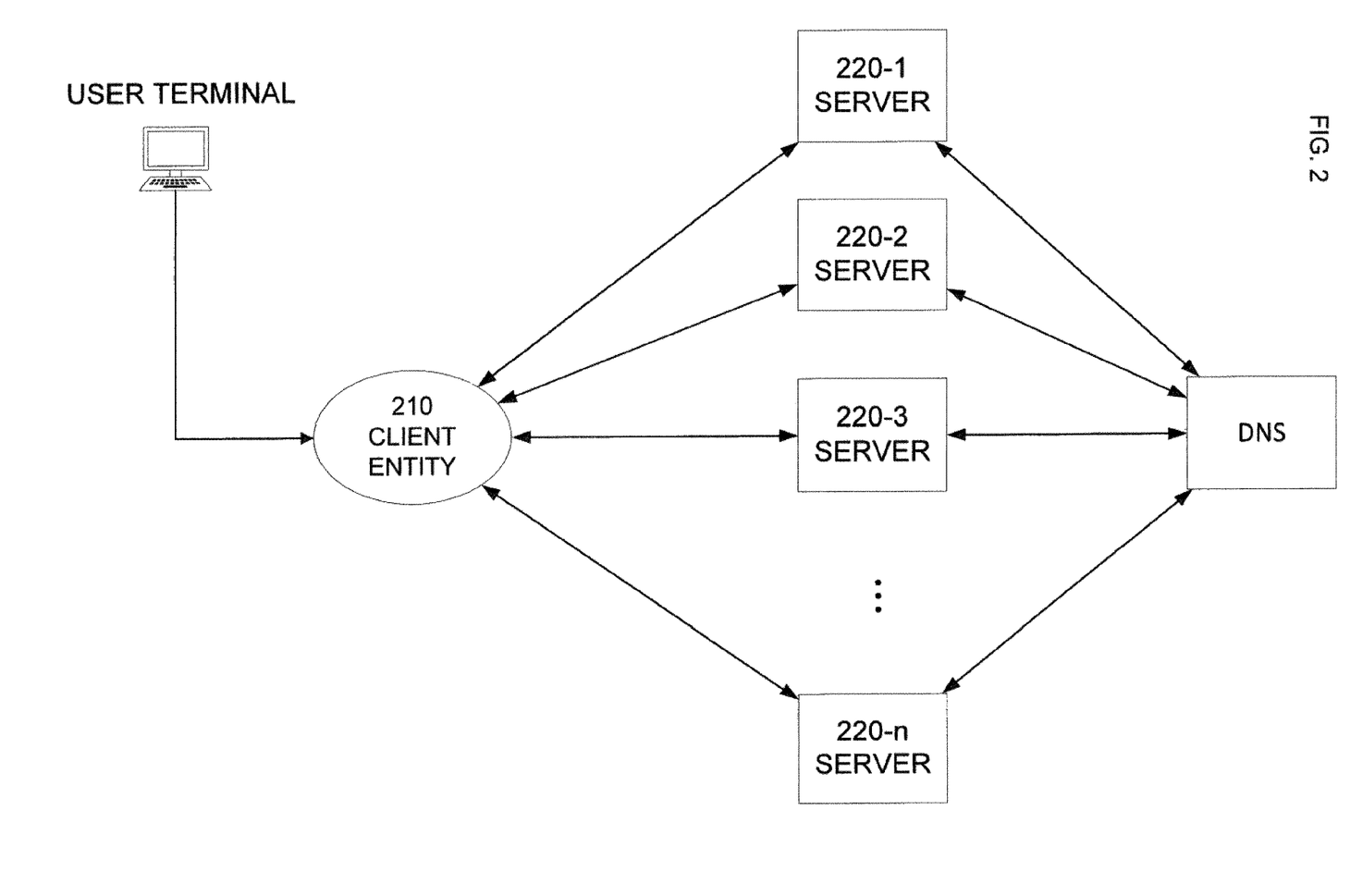
FIG. 2 shows a schematic overview of an exemplary network environment in which communication is managed according to an embodiment of the invention.

In another example, as shown in FIG. 2, the client may receive a request from a user terminal, such as a mobile or fixed terminal requesting web access. In a further example, a request from a terminal device may be an incoming call. Alternatively, the user of a terminal device may request a desired content by selecting a link on terminal device itself. The client may then contact one of the plurality of servers so as to retrieve the desired service or content.

The system may further comprise a communication network, through which the client entity and the plurality of servers may exchange request and response messages. Namely, the client entity may connect to the plurality of servers over the network.

Embodiments of the present invention may address that the selection of a server according to the conventional art does not take into account the change of the load of the server during time, namely the fact that the processing load of each server in the plurality may fluctuate in time. For example, a server with a high capacity may be initially very loaded and may become less loaded later, while its static capacity remains constant since its internal configuration did not change. Moreover, embodiments of the present invention may address that the processing load is affected by changes in the configuration of the plurality of servers. For example, a server of the plurality may be out of service, a new server may be added to the plurality, and a server may change its processing capabilities. All these events may affect the load on each server.

In the conventional art, when the network is deployed with a pool of servers, where all of them may be able to manage the same requests, the client entity, or client, may select the most appropriate server to receive a request based on the server load, i.e. the request may be sent to the less loaded server.

A client may implement a traffic load balancing algorithm that could be based on the static traffic load capacity, or weight, of the servers. A conventional load balancing method is based on DNS SRV (Service) records (cf. IETF RFC 2782 "A DNS RR (Resource Record) for specifying the location of services (DNS SRV)"; see http://tools.ietf.org/html/rfc2782). Following this conventional method, the client may periodically request the SRV records of the servers in the pool to a DNS. Such DNS needs to be configured accordingly. The SRV record may include for each server a weight value. This weight value may provide information about the server (static) capacity and it may be used for load balancing. For example, if a first server has a weight value that is double than a second server, then the first server will receive a double amount of requests than the second server.

Related standardization work in IETF DIME (diameter Maintenance and Extensions) WG (Working Group) for Load control mechanism (cf. IETF draft-ietf-dime-load-01, titled "Diameter Load Information Conveyance" of Oct. 12, 2015; see https://tools.ietf.org/html/draft-ietf-dime-load-01), is considering how dynamic server load can be conveyed from the reporting node (server) to the reacting node (client). Accordingly, load information may be directly conveyed in DIAMETER responses from the reporting node to the reacting node. The basics of the mechanism for allowing the dynamic server load communication cited above is described in the above IETF draft, whilst the meaning of reporting node and of reacting node is described in IETF RFC 7683 (see https://tools.ietf.org/html/rfc7683).

However, the usage of DNS SRV records for load balancing may have limitations. In fact, first, it may require DNS interrogation by reporting nodes. Although DNS is quite common in network deployment, if DNS SRV records are used to obtain server weights, then DNS turns to be compulsory and reporting node needs to frequently interrogate it. Further, the above mentioned weight does not reflect dynamic server load. In fact, the weight value may be just acquired when DNS is interrogated, and moreover, the weight value is a static data. Therefore, the actual server load is not reflected, as a consequence any load balancing mechanism based on this may be inefficient. Embodiments of the present invention may also address that DNS SRV may be improved with the proposal to consider dynamic server load, but even with such proposal, other requirements are not solved.

The dynamic load for each server in a pool may need to take into account rest of pool servers' capabilities. There are attempts for diameter protocol, to provide dynamic load server values. The DIME standardization work may make dynamic load available in the client, such as the dynamic server load may be conveyed from reporting to reacting nodes. However, dynamic generated load by each server may be—according to the prior arts—just an internally generated value that does not take into account any other server' capability. Therefore, unless all servers in the pool have the same capability, which may be very uncommon, the dynamic load provided might not be very useful for load balancing purposes among the servers' pool, in fact any load balancing mechanism based on this load may be inefficient.

Further, traffic load may need to be balanced among a specific group of servers, referred to herein as load-balancing context. In fact, network deployments may be rather complex, namely they may not be limited just to a typical pool of servers accessible from a client. For example, the topology shown in FIG. 5 is quite common in real networks. In this example, in each deployment, the group of servers that may be able to receive and process the same request is identified. It is referred to this group as the load balancing context. In this deployment, the load balancing context is servers S1-S4. In this case, it is up to C to be able to distribute between S1-S4, but C does not have any valid information to be able to select the most appropriate server.

In addition, traffic load may need to be balanced among a dynamic pool of servers, referred to herein as dynamic load-balancing context. In fact, the amount of servers among whom the load shall be balanced may vary dynamically. At least following situations shall be taken into account: a server may be out of service while some maintenance is performed; a new server may be added to the pool; and an existing server may vary its traffic load capabilities (static weight) due to an upgrade. For example, the number of hardware resources assigned, or available, to a server—e.g. in terms of processors, memory, communication interfaces, etc.—underwent a change, implying increased or decreased resources availability (e.g.: a new processor or memory board added, or an existing processor or memory board removed, or a communications board being added or removed, etc.).

This means that the load-balancing context may be dynamic. Nowadays, a reporting node may only update load-balancing context if DNS is properly updated to reflect that, and reporting node keeps interrogating DNS frequently. However, reporting node DNS interrogation is never a real-time activity, then data kept may be obsolete, and if so, load-balancing mechanism will cause load unbalance, which may be rather dramatic for some network deployments.

Therefore, with the existing solutions and ongoing standardization work, the best approach may be that a reporting node performs load-balancing based on dynamic server load values, that do not consider the relative load capability of the reporting node among the load-balancing context. Even more, the load-balancing context may not even be known or updated when modified. In this case, at least the following problems have been identified by the inventors.

One problem may be that efficient load balancing is not possible for some network deployments. That is, if the load balancing context is unknown to a reporting node, load balancing among servers may not be able to properly balance the load. Accordingly, resource usage may be inefficient.

Another problem may relate to traffic oscillations and constant internal load recalculations. A low loaded server, regardless of its relative capacity compared with the rest of servers in the pool, will receive more traffic. This may increase rapidly the load of this server. Thus, the server may be forced to recalculate constantly load values and provide them to the client, which should react diverting traffic to other servers in the pool. However, as soon as this server load decreases, it would be again selected and traffic will rapidly increase.

Further, a problem may relate to inefficient resource usage. A low loaded server may always be selected, regardless whether more loaded servers in the pool have in fact more available capacity to process a request.

Another problem may relate to the fact that rapid load increase may cause overload situations. Low capacity servers may be selected as soon as their load decreases, then a peak of traffic may cause them to enter in overload, if the server selection algorithm is not able to divert traffic on time.

Therefore, the reacting node (client) may need to find a way to identify what, is the corresponding load-balancing context, i.e. the group of servers among which the load needs to be balanced, and it has to be updated immediately if modified. Then the reacting node may need to be able to select the most appropriate server based both on the dynamic load and the server capability.

The conventional art, in the context of distributing DIAMETER protocol request between clients and servers, addresses the traffic load distribution problems by defining and further distributing DNS (Domain Name Server) SRV (Service) records, as described in RFC 2782 (cited as reference 2)). In this conventional solution, the SRV record received by a client includes for each server a weight value referring to the server. Thus, if a first server has a weight value that is double than a second server, then the first server will receive a double amount of requests than the second server. This is a solution based on static capabilities, which may change on a per individual server basis. Further, it is cumbersome and complex, since it requires DNS queries to be implemented and run by the clients frequently, and requires a frequent updating to DNS servers—which are, generally, quite loaded due to frequent DNS queries—about weight information relating to each selectable server (for example, DNS server/s to be updated in respect to SRV records when a server goes down due to maintenance, when a server is upgraded or downgraded about NW resources, when a server is added or removed to attend certain requests from a client, etc).

The conventional art also envisages a server sending to the client/s information about its current load (e.g. IETF draft-ietf-dime-load-01; cited as ref [5]). However, this solution does not take into account that, for example a currently low loaded server may become overloaded quickly, i.e. after reporting a relatively load figure, because their HW resources are very limited.

Further, the conventional art discloses sending information in the direction server to client (either directly or indirectly via DNS responses) so as to allow the client to load balancing their future request/s to the available servers. However, the conventional art does not disclose, nor hint, the feature of the server combining static capabilities with dynamic current load, so as to produce a "load" figure that may be sent to the client/s, so as to be used therein for load balancing further requests.

The present invention addresses the problem of how to fairly and accurately load balancing requests of one or more clients among a group of servers; wherein the servers can have distinct static capabilities and different load situations.

The present invention discloses a solution that implies the server making a calculation—for transmitting a fair figure relating to its current load and capacity for handling further requests from clients—taking into account, both: a figure dealing with its static capabilities (e.g. the standardized weight on RFC 2782), and a figure dealing with its current dynamic load (e.g. expressed on a percentage basis). According to one embodiment, both of these figures may be operated with a factor (e.g. eventually divided or multiplied by a factor) and transmitted to a client from the server. Therefore, the client, by receiving the results of similar calculations—i.e. results of calculations made in the same manner by a plurality of servers to which said client can send a request, namely, the plurality of servers being recited herein as load balancing context—may fairly and accurately, select the most appropriate server to receive its future request/s.

For this purpose, the present invention proposes the definition of a load balancing context for each client, which may consider all the servers that could receive and process a request from that particular client. Each server within the load balancing context may calculate its dynamic load frequently and, further based on its static capacity, i.e. the weight—as defined by the prior art—, that is defined in comparison with the rest of servers in the load balancing context. It may further calculate a value (Relative Dynamic Load (RDL) value, in one example) that determines the real capacity of each server at each time, in comparison to the rest in the load balancing context, to be able to process a request from a client.

In one embodiment of the present invention, the client entity sends a request message to one of the plurality of servers, for processing by the server. The sending of a request message may be triggered by an incoming request from a terminal device (or user terminal), as shown for example in FIG. 2.

The choice of the server to whom to send the request message may be the result of a selection. Such initial selection may be based on default selection values, which may indicate information about a static load of the servers, or they could be nominal values set in advance. The default selection values may be stored at the client entity. Further, the choice of the server may also be based on other criteria or it may be random.

In the case of a system comprising agents interposed between the client entity and the plurality of servers, when there is a single agent, the client entity may send requests to the agent and the agent may select the request destination from the set of candidate servers. In the case of multiple agents, a client may select between multiple agents, and each agent may select from multiple servers.

Once a server receives the request message from the client entity, such server computes an indicator for a processing load of the server. Namely, the indicator may indicate a processing load of the server computing said indicator. The processing load may take into account both the current load on the server and the capacity of the server in handling the processing. Accordingly, the indicator for the processing load of the server may represent dynamic information about the server. For example, the processing load may take into account the number of requests the server is currently processing and its capacity. Said indicator may be a numerical value. For example, the indicator may be identified with the RDL value described above.

Moreover, the server includes information relating to said indicator into the response message. Said information may be information dependent on the indicator, or, for instance, another numerical value which relates to the numerical value of the indicator. In another example, the server may forward the indicator directly to the client entity.

The server then sends the response message to the client entity.

The client entity then stores said information relating to said indicator. Namely, upon receiving the response message from the server, the client entity may store at least temporarily, information relating to the computed indicator. In the case the server send the indicator directly, the client entity may store the indicator as received.

Storing may comprise storing the information relating to the computed indicator and/or the computed indicator as a new item in a storing unit or updating a relative item already comprised in the storing unit. Namely, the client entity may create a new record in the storing unit corresponding to the server and may store the received data therein. In the case where the storing unit already has an indicator and/or information corresponding to said indicator, it updates said indicator or said information corresponding to the indicator which is already stored.

In one example, the client entity may initially store nominal, or default, values of the indicator and/or nominal, or default, information about the indicator. In this case, once the client entity receives the response message, it may update the nominal value of the indicator and/or the nominal information about the indicator in the storing unit.

Further, the client entity selects a server from said plurality of servers for sending a further request message to one of the plurality of servers. As above, the further request message may be triggered by an incoming request from a terminal device. Such selection by the client entity may be made—among other criteria—on the basis of the stored information relating to one or more indicators for the processing load of one or more of the plurality of servers, e.g. on a per server basis. The selection comprises a comparison operation among the stored information relating to the indicators or a comparison of the indicators. In one example, in the case the client entity stores information relating to the indicators of each server of the plurality, the selection may be performed at least on the basis of stored information relating to all the indicators of the plurality. In another example, in the case the client entity stores information relating to the indicators of a part of the servers in the plurality, the selection may be performed at least on the basis of stored information relating to the indicators of a part of the servers in the plurality and the nominal, or default, values.

Accordingly, an embodiment of the present invention may allow to select a server from a plurality of servers taking into account the current state of the plurality of servers. It is in fact based on dynamic information about the plurality of servers, namely the current state of the load each server as well as the processing capacity of each server of the plurality. The selection may be based on indicators for a processing load which are computed at each server of the plurality.

As a result, the selection of a server from the plurality of servers may be very accurate as it may be based on information—the indicator—including a combination of a processing capacity and the current state of the load.

In one embodiment of the present invention, the indicator is computed from a first information expressing a static processing capacity of the server and from a second information expressing a current processing load of the server.

The static processing capacity may relate to the processing resources configured in the server. For instance, it may relate to the number and/or nominal capacity of the processors included in the server, the number and/or nominal capacity of its memory boards and/or of its communication boards, etc. For example, a powerful server with processors which can efficiently handle demanding workloads will have a high static processing capacity. In one example, the static processing capacity may be retrieved periodically from a DNS, as shown in FIG. 2. Namely, the server may periodically request SRV (Service) records including information about the static processing capacity from the DNS. In another example, the static capacity may be stored locally in each server instead of in the DNS SRV. This value may be configured for all servers in a pool, i.e. in the context where the load balancing is performed.

The current processing load of the server may depend on the number of requests from one or more clients the server has to process per unit of time. Such amount of requests can vary on time. Therefore, the current processing load represents dynamic information which varies in time. In one example, the information expressing a current processing load of the server may comprise information about a processing load of the server in a predetermined time interval, namely computed over a predetermined time interval. It may be stored in the server and periodically updated. In another example, such information may be computed each time a response is required by the client entity. It may also be based on the number of requests received from the one or more clients.

Namely, the static processing capacity may be dependent on the static configuration of the processing resources in the server, while its current processing load may be dynamic and may depend on how the processing of clients' request messages currently loads—or overloads—the static processing resources of the server.

Moreover, the second information (e.g. information conveying a current processing load of the server) comprises information on an internal dynamic load of the server.

Further, the indicator comprises a numeric figure obtained by computing a ratio between a first numeric figure representing the first information and a second numeric figure representing the second information. Accordingly, the numeric figure comprised in the indicator may be directly proportional to a static processing capacity of the server and inversely proportional to the current processing load of the server. A numeric figure may be for instance a number.

Alternatively, the indicator may comprise a numeric figure obtained by multiplying the first numeric figure representing the first information and the second numeric figure representing the second information. In another alternative, the indicator may comprise a numeric figure obtained by computing a ratio between the second numeric figure and the first numeric figure.

The figure expressed by the indicator can be obtained by optionally further multiplying said ratio by a normalization factor. The normalization factor may be any factor different from zero and it may be used to make the comparison simpler. Further, the normalization factor may be commonly used among the plurality of servers, namely each server of the plurality may use the same normalization factor. Moreover, each server may use the same normalization factor when computing an indicator relating to a specific client entity, while it may use another normalization factor when computing an indicator relating to another client entity. In addition, said figure may be calculated differently from the formulations described above.

Furthermore, the selection of a server from said plurality of servers comprises the selection of a server for which the stored information relates to, either, a lowest indicator figure, or a highest indicator figure. Namely, once the numeric figure relating to the indicator of one or more of the servers in the plurality are obtained, a server may be selected which has either the highest or the lowest numeric figure relating to its indicator. Such selection may be made based on the fact that a server with the least processing load should be selected, i.e. the least loaded server should be selected. For instance, when the amount of processing load is proportional to the indicator figure, the lower the processing load is, the lower the indicator figure is, so that the server with the lowest numeric figure may be selected. On the other hand, when the amount of processing load is inversely proportional to the indicator figure, the lower the processing load is, the higher the indicator figure is, so that the server with the highest numeric figure may be selected.

Furthermore, the selection of a server from said plurality of servers is further based on stored information by the client entity indicating a static processing load of one or more servers. In one example, in the case the client entity may store information relating to the indicators of a part of the servers of the plurality, the selection may be performed at least on the basis of stored information relating to the indicators of a part of the servers in the plurality and stored information indicating a static processing load of one or more servers.

In another embodiment, the first numeric figure representing the first information and the second numeric figure representing the second information may be conveyed from the servers, or reporting node, to the client entity, or reacting node, and the client entity may calculate the indicator.

In a further embodiment, with reference to FIGS. 5 and 7, in the case where the system comprises multiple agents, namely multiple agents are used to route towards the load balancing context, (A1 and A2 in FIG. 7) the server RDL, i.e. the indicator described above, may need to reach not only the intermediate agent (A1 or A2) but the corresponding client. In order to achieve this, Ax may need to know when the received RDL needs to be forwarded towards the node from where it received the request, or on the contrary it is only meant for local knowledge. The agent may make that distinction as follows:

- If the RDL is received from a server that belongs to the load-balancing context of Ax, then Ax may need to store this information. In fact, one server may belong to more than one load-balancing context, like in this example, where S1 belongs to the load-balancing context of A1, while it belongs as well to the load-balancing context of C. In C or A, it may need to be configured initially which Servers belong to the load-balancing context.
- If the received request is routed towards Sx (the way this is identified by the agent depends on the protocol, e.g. in diameter this request may include a Destination Host AVP), i.e. in the case where it is not to Ax to determine the Sx within its local pool, then when this Sx RDL is received, the agent may need to forward this RDL back to the original source (e.g. in diameter the original source is identified by means of the Origin-Host AVP in the received request). In this example, C may not need to get A1/A2 RDL, since C needs to select the best destination server.

As a result, the most optimal server in a pool of similar/equivalent servers (load balancing context) may receive a further request from the client.

Therefore, it may be possible to achieve efficient and accurate load balancing among a group of servers of different capabilities (load balancing context). Further, the group of servers may not need to be defined in the same pool, but may be defined in several of them, accessed by different clients and/or agents.

Efficient and accurate load balancing may be achieved even when the load balancing context vary. For example, a new server or group of servers may be included/excluded in/from this context. Any server may vary its capability.

It may be further possible to obtain an efficient usage of server load capability, whereas traffic oscillations may be avoided.

Furthermore, constant internal load calculations in each server may be minimized, thereby implying a more efficient resource usage, and rapid load increase, which may cause an overload situation in a server, may be avoided.

Figure 3:
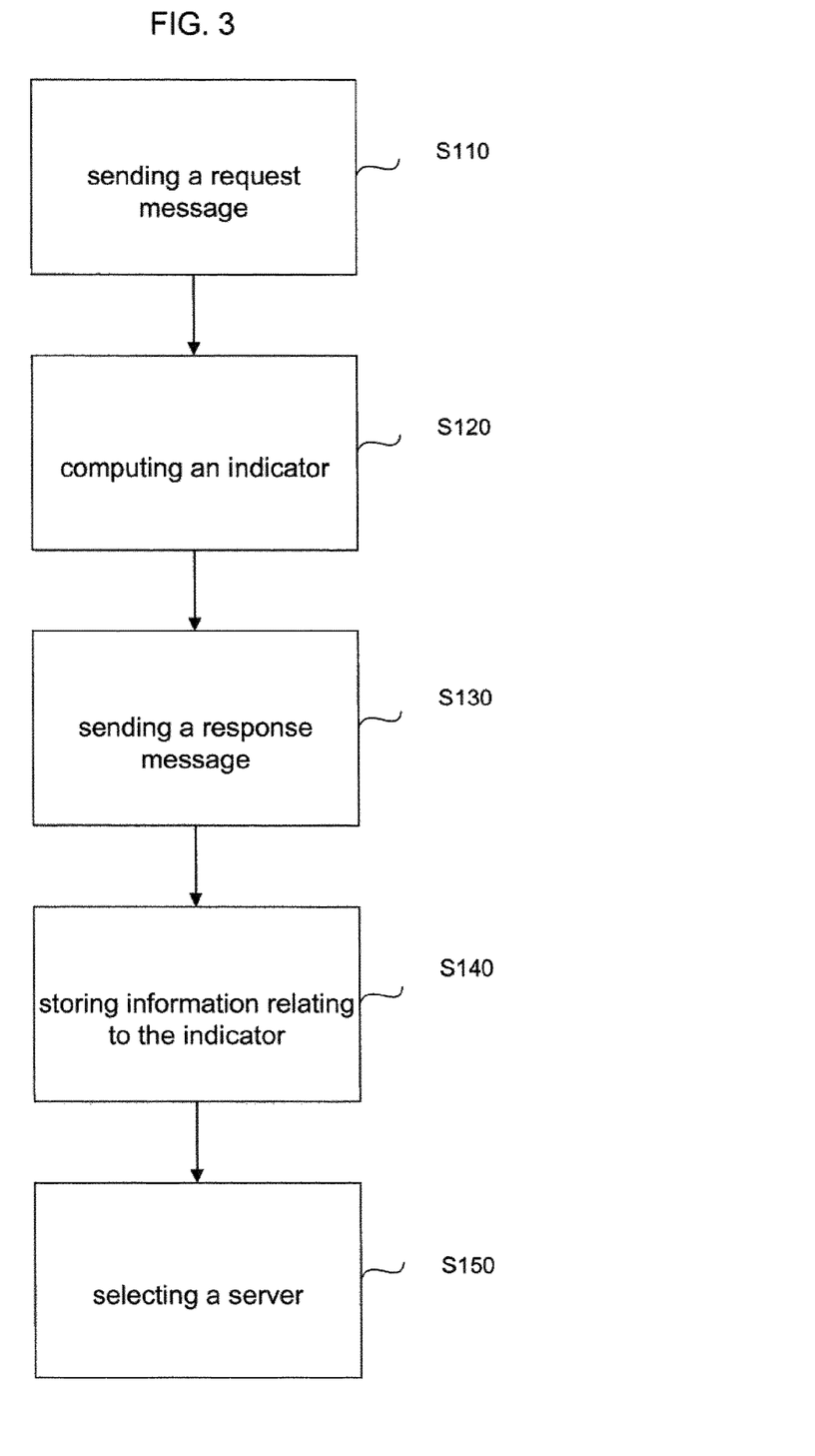
FIG. 3 shows a flowchart of a general method embodiment of the present invention.

FIG. 3 shows a schematic overview of an exemplary method for managing communication in a system according to a first embodiment of the present invention. The considerations made above also apply to the present embodiment and are therefore omitted.

The method comprises the step of sending S110, by the client entity 210, a request message to one of the plurality of servers 220-1 to 220-n, for processing by the server.

The method further comprises the step of computing S120, by the server receiving the request message, an indicator for a processing load of the server. Said step comprises including information relating to said indicator into the response message. In a step S130, the server sends the response message to the client entity.

Further, the method comprises the step of storing S140, by the client entity, said information relating to said indicator.

The method further comprises the step of selecting S150, by the client entity, a server from said plurality of servers for sending a further request message to one of the plurality of servers.

According to an optional implementation of the first embodiment, the indicator is computed from a first information expressing a static processing capacity of the server and from a second information expressing a current processing load of the server.

According to a further optional implementation of the first embodiment, the second information comprises information on an internal dynamic load of the server.

According to a further optional implementation of the first embodiment, the indicator may comprise a numeric figure obtained by computing a ratio between a first numeric figure representing the first information and a second numeric figure representing the second information.

According to a further optional implementation of the first embodiment, the figure expressed by the indicator is obtained by further multiplying said ratio by a normalization factor.

In addition, according to a further optional implementation of the first embodiment, the step of selecting a server from said plurality of servers comprises selecting a server for which the stored information relates to, either, a lowest indicator figure, or a highest indicator figure.

According to a further optional implementation of the first embodiment, the selecting of a server from said plurality of servers is further based on stored information by the client entity indicating a static processing load of one or more servers.

Next, a system according to a further embodiment of the present invention will be described with reference to FIG. 2. The considerations made above also apply to the present embodiment and are therefore omitted. The system 200 according to the second embodiment comprises a client entity 210 and a plurality of servers 220-1 to 220-n. As mentioned above, the client entity is configured to send request messages to the servers and the servers are configured to process a request message received from the client entity and to send to the client entity a response message as a result of processing said request message.

The client entity is further configured to send a request message to one of the plurality of servers for processing by the server, to receive a response message from the server receiving the request message, to store from the response message received from the server information relating to an indicator for a processing load of the server, and to select a server from said plurality of servers for sending a further request message to one of the plurality of servers.

The selection is preferably made (e.g. exclusively, or in addition to other factors) on the basis of the stored information relating to one or more indicators for the processing load of one or more of the plurality of servers.

Further, the server is configured to receive, from the client entity, the request message for processing by the server, to compute said indicator, to include information relating to said indicator into the response message, and to send the response message to the client entity.

Figure 4:
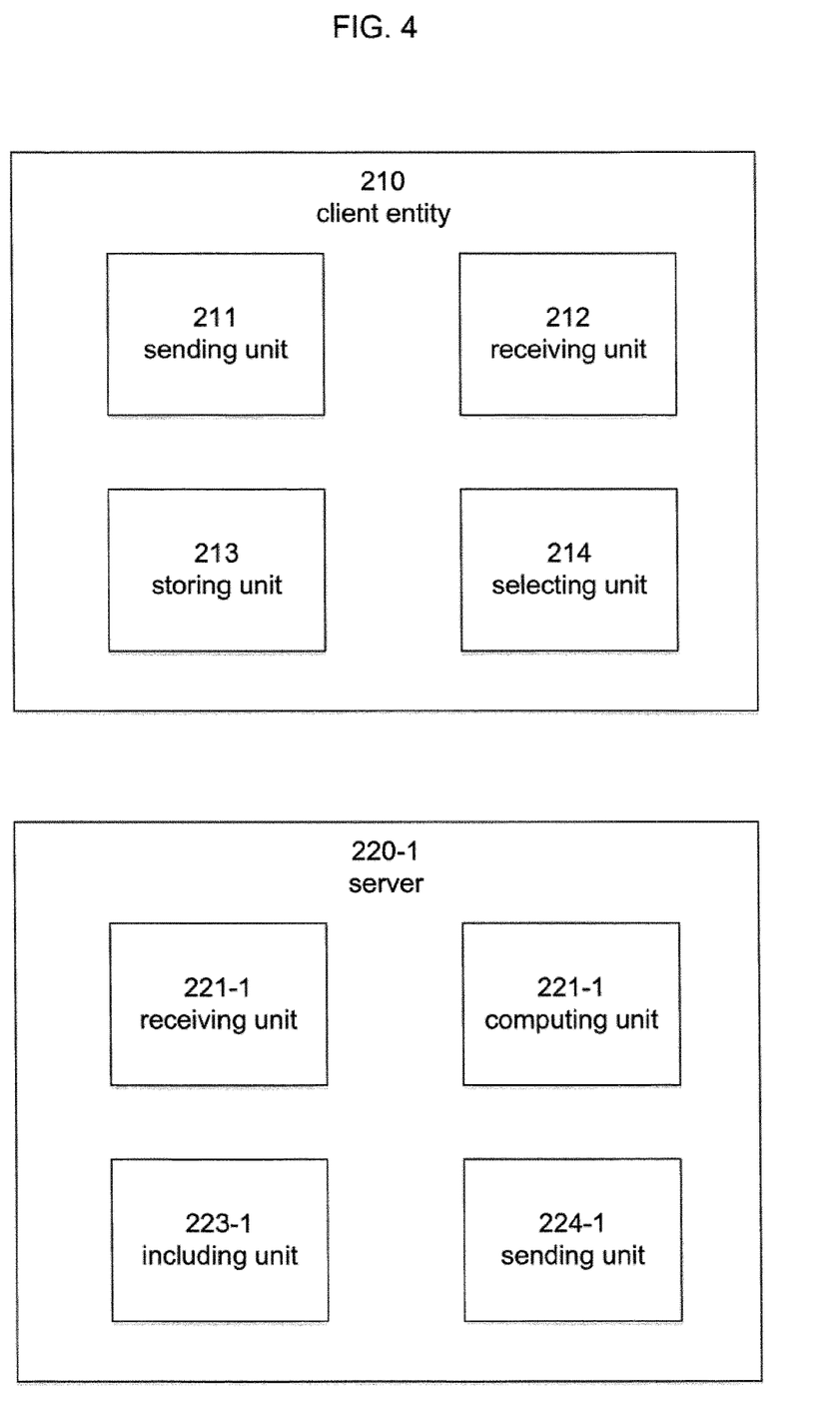
FIG. 4 shows a schematic overview of a client entity and a server according to another embodiment of the present invention.

Next, a client entity according to a further embodiment of the present invention will be described with reference to FIG. 4. The client entity 210 according to the third embodiment may comprise sending unit 211 configured to send a request message to one of the plurality of servers for processing by the server and receiving unit 212 configured to receive a response message from the server receiving the request message. It may further comprise storing unit 213 configured to store said information relating to an indicator for a processing load of said server, and selecting unit 214 configured to select a server from said plurality of servers for sending a further request message to one of the plurality of servers. Said selection may be made at least on the basis of the stored information relating to one or more indicators for the processing load of one or more of the plurality of servers.

Next, a server according to another embodiment of the present invention will be described with reference to FIG. 4. The server 220-1 according to said embodiment may comprise receiving unit 221-1 configured to receive, from the client entity, a request message for processing by the server. It may further comprise computing unit 222-1 configured to compute an indicator for a processing load of the server and including unit 223-1 configured to include information relating to said indicator into a response message. Moreover, it may comprise sending unit 224-1 configured to send the response message to the client entity.

According to the above, an embodiment of the present invention is presented in the following procedures/steps.
a) Load balancing context: for each deployment, for each client, it is identified the group of servers that may be able to receive and process the same request, referred herein as the load balancing context. For example, in the deployment of FIG. 6, if we consider diameter traffic: Servers S1 to are considered the load balancing context from C perspective. This may need to be configured in each client. For example, for diameter traffic load balancing, C may be an MME/SGSN that sends a diameter request to an HSS, that in fact is implemented as HSS-FE1 (S1) to HSS-FE4 (S4).
b) Each server is configured or has accessed (via DNS) to its weight (SRV). The operator may need to consider the relative capacity of each server (Sx) in order to be able to manage a request from C. For example, S2 may have more processing capacity if it is running in a more powerful HW. The static capacity (weight) of each server Sx in the load balancing context is configured in a common DNS using SRVs, as explained in the background as existing functionality, or it can be configured locally in each server.
c) Relative Dynamic Load calculation in each server. Each server may periodically calculate its internal dynamic load (DL). However, each server may need to take into account its relative capacity within the corresponding load balancing context in order to calculate the relative dynamic load (RDL). In one example, the RDL is the indicator described above. According to the present invention, it is possible to calculate the RDL as follows, taking into account its weight (i.e. its static capacity) in, the context it is working (load balancing context):

$$RDL = 10000 \times (DL/\text{weight})$$

RDL may vary from 0 to 100000. It is multiplied by a factor (10.000 in the example) to manage number bigger than 0 for most cases, in order to ease comparison. However, any factor different from zero can be used as long as it is commonly used by all of a set of servers.

DL divided by Dynamic Load may provide a theoretical value of the load per resource unit (each weight unit), this may be used to compare load between different servers with different weight values.

For example, we consider the following:
Server1: weight=1500; DL=2%
Server2: weight=55000; DL=70%

It should be noted that the weight may vary from 0 to 65.535, following existing SRVs. While DL is the load measured at time=t, that is presented as a percentage from the total usage of the node, i.e. 0 means all resources are available, while 100 means that all resources are busy, then the node is totally loaded and it does not accept more load. Then, in this example, if only the weight is considered for load balancing, Server2 may be considered as more capable to deal with the traffic. However, by taking into account only the DL values, Server 1 seems to be less loaded.

According to the present invention, it is proposed to calculate RDL to identify which is the less loaded server within a group (load balancing context) taking into account its weight within the group and its dynamic load. In the example above:

$$\text{Server1} RDL = 10000 \times (2/1500) = 13.33$$

$$\text{Server2} RDL = 10000 \times (70/55000) = 12.73$$

Accordingly, Server2 is a bit less loaded than Server1, and therefore Server2 may be the best candidate for load balancing.

Further, it should be noted that a server may belong to multiple load balancing contexts for different clients. When relative dynamic load is calculated, it should take into account the corresponding client.
d) RDL calculated internally in each server within a load-balancing context is made available at the client. The RDL is the value sent from the Server (Sx) to the corresponding client (C). Different means to convey this information from a server (Sx) to a client (C) are possible. Therefore, according to the present invention it is possible to include RDL in this AVP, rather than DL, in order to take into account the dynamic load balancing context.

With this feature, a client C may get information about the Relative Dynamic Load (RDL) of a plurality of servers (S1-S4 RDLs), instead of just obtaining information about static server's capability (i.e. weight) and instead of just receiving server's—own—estimated current load. The RDL information received from a client C from—preferably—a plurality of servers may then be advantageously used by the client C to select the best destination when a request from said client (C) needs to be routed to one of these servers.

Advantageously, the present invention may take into account any load-balancing context modification. In fact, at any time the following parameters may be easily modified and the mechanism described above may take up to date values for the calculation of the RDL:

A server static capacity (SC) is modified: DNS SRV is modified. Each server in the context may be configured to read periodically SRVs. As an alternative, SC may be configured locally in each server, then, when modified, this value is taken immediately into account for RDL calculation.

A server is added to the context: an SC needs to be configured for this new server. In the corresponding clients or agents, this new server may need to be defined as part of the load-balancing context.

A server is removed permanently from the context: in the corresponding clients or agents, this new server needs to be removed as part of the load-balancing context.

A server is temporary down or removed for maintenance: no need for any action.

Figure 8:
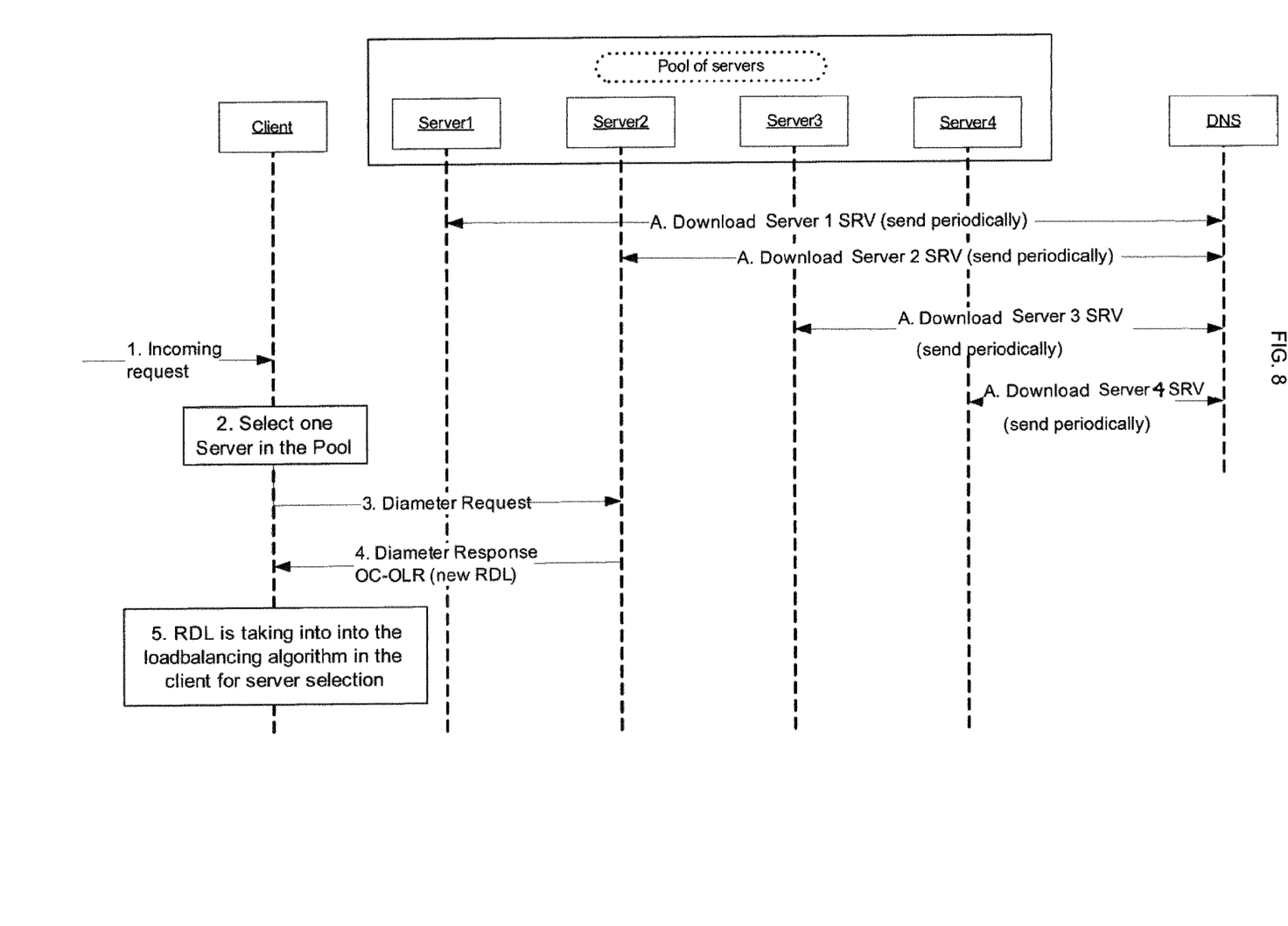
FIG. 8 shows a schematic overview of an exemplary method embodiment of the present invention.

A further embodiment of the present invention will be described with reference to FIG. 8. In this case, diameter traffic is considered. Client (reacting node) and servers (reporting nodes) support DOIC protocol as standardized in IETF RFC 7683 [3].

In step A, each server may periodically contact the DNS, where its static weight is configured. This may be modified by an operator if the weight is modified. An alternative to this step may be to configure locally this value in each server.

In step 1, a request is received.

In step 2, the client may need to send the request to be processed by one server in the pool. Each server in the pool can be differently loaded. The very first time a request is received, the client may not have dynamic information, for example, RDLs. In this case, the server selection may be based on other criteria. An example of other criteria is the static server weight.

In step 3, since in this example Server2 is selected, the diameter request is sent to Server2.

In step 4, Server 2 includes information about its load in the diameter response, as DOIC requires. According to the present invention, in order to convey the RDL, a new Sub-AVP may be added in the OC-OLR grouped AVP.

In step 5, the procedure described in steps 3-4 may be repeated towards different servers, and then the Client may obtain RDL information about the servers in the pool. This information is very relevant to select the less loaded server in this particular pool (i.e. load balancing context).

Figure 9:
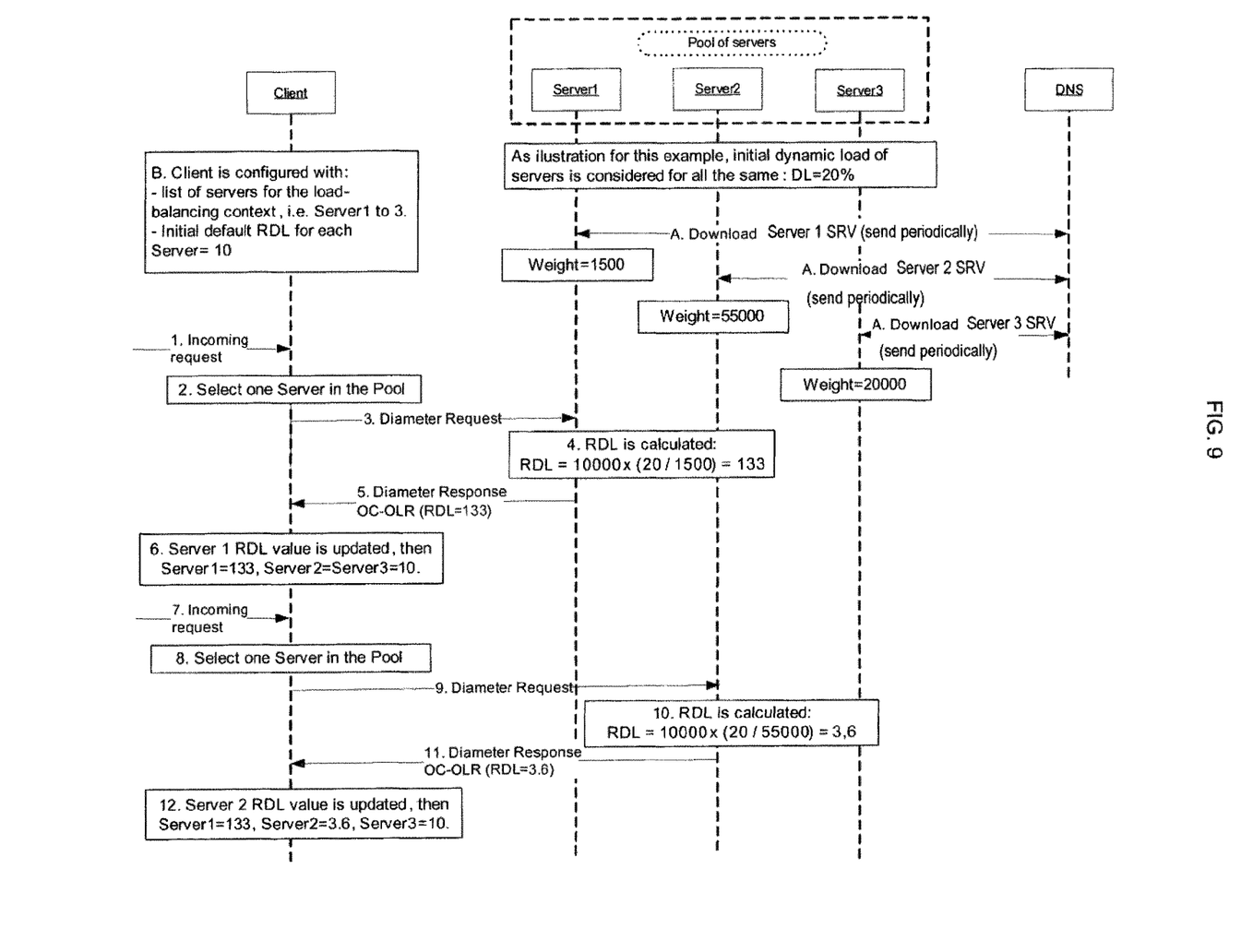
FIG. 9 shows a schematic overview of another exemplary method embodiment of the present invention.

In addition, a further embodiment of the present invention will be described with reference to FIG. 9. Also in this case, diameter traffic is considered. Client (reacting node) and servers (reporting nodes) support DOIC protocol as standardized in IETF RFC 7683 [3].

In step A: each server may contact periodically the DNS, where its static weight is configured. This may be modified by an operator, if the weight is modified. An alternative to this step may be to configure locally this value in each server. As an example, some values of weight for each server are considered:

Server 1 weight=1500
Server 2 weight=55000
Server 3 weight=20000

As an illustration for this example, an initial dynamic load for each server is considered. In this example, the same value for all servers in the pool is defined: DL=20%.

In step B: the client may be initially configured with the definition of all the servers in the load-balancing context. (in this case, it means Server 1, Server 2 and Server 3). An initial default RDL value may be defined in order to start the mechanism described in this invention. This RDL value may be configured in each case, depending on the initial load that may be expected for servers in the load balancing context (e.g. some servers may be used for some other purposes). If there is no information on the load in each server, then a "low level load" may be defined, for example RDL=10 (RDL varies from 0 to 100000, as discussed above). This ensures that as the load is increasing within the load balancing context (server pool), then all servers in the pool may be selected at least once, and thus the real value of load (RDL) may be provided by the corresponding server.

The process performed when an incoming request is received is now described according to steps 1 to 12.

In step 1, a request is received.

In step 2, the client sends the request to be processed by one server in the pool. Each server in the pool may be differently loaded. In this example, the client may be configured with an initial default RDL for all the servers in the load balancing context. In this case, this value may be the same for all. The client may then select one server randomly, e.g. Server 1.

In step 3, the diameter request is sent to Server1, since in this example Server1 is selected.

In step 4, Server 1 RDL is calculated based on the weight provided by the DNS and the DL we have considered as an example. Alternatively, the weight may be configured in the server itself. The RDL may be calculated just when the response is required (i.e. in step 4) based on the DL measured in this moment or pre-calculated periodically. As an alternative, the RDL may be calculated periodically and only modified when the DL is substantially modified.

In step 5, Server1 includes the calculated RDL in the diameter response. According to the present invention, in order to convey the RDL, a new Sub-AVP may be added in the OC-OLR grouped AVP.

In step 6, the client updates Server 1 RDL.

In step 7, a new incoming request arrives, and the steps above are repeated.

In step 8, the client takes into account new value of Server1 RDL for server selection. It selects the less loaded server, i.e. the one with smaller RDL value. Accordingly, in this example, either Server 2 or Server 3 may be selected. This selection may be random. In this example, Server 2 is selected.

In step 9, a request is sent to the selected Server2.

In step 10, Server2 calculates its RDL value to be sent in the response, as explained in step 4.

In step 11, the new RDL value is included in response as explained in step 5.

In step 12, the clients updates the RDL value, as explained in step 6 and the process continues as new incoming requests are received.

As seen above, the present invention proposes a method to define a relative dynamic load (RDL) of a server within a group (load-balancing context), which may allow a client or agent to be able to determine the best receiver for a request, taking into account that multiple servers are able to process that request, where the best receiver is the least loaded at any moment. This requires that the calculated RDL is conveyed to the corresponding client.

A further advantage of the present invention may reside in that it allows that the group of servers within the load-balancing context may vary, thereby allowing the mechanism to work efficiently.

Figure 10:
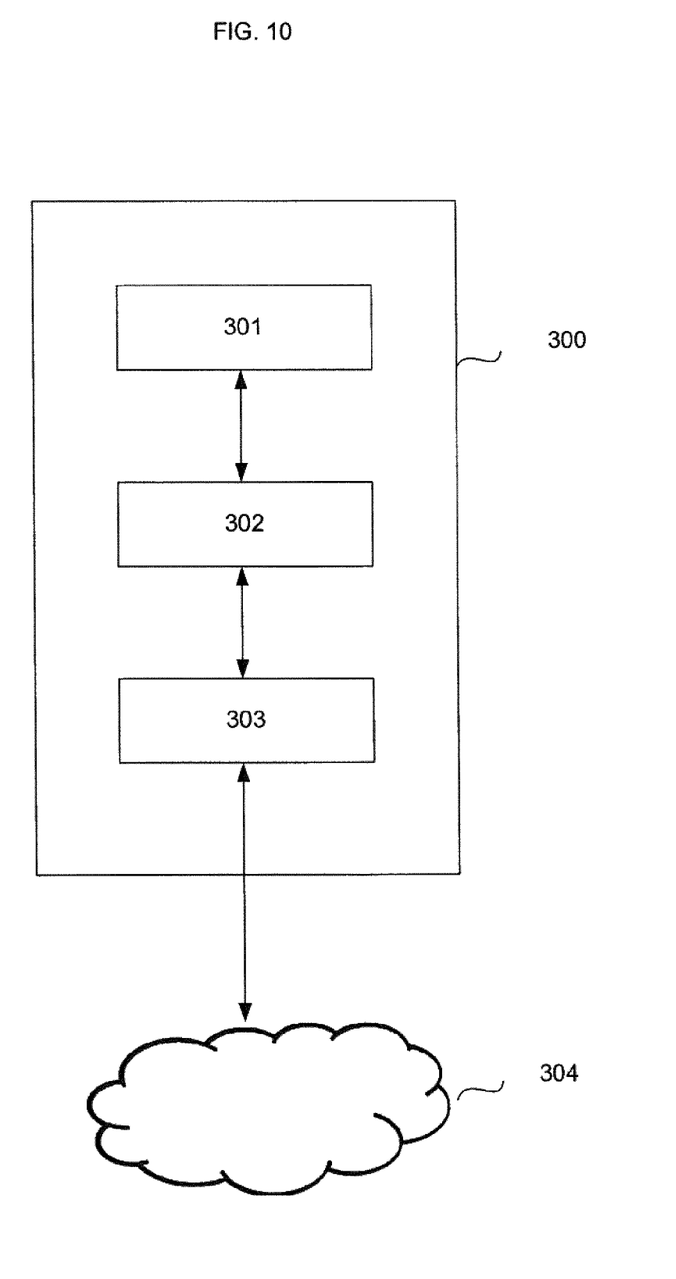
FIG. 10 shows a schematic view of a general entity embodiment of the present invention.

FIG. 10 shows a schematic view of a general entity embodiment of the present invention. The entity can be any collection of processing and memory resources that are suitable for implementing the corresponding units of a system according to the present invention. For example, the entity 300 can be implemented as a stand-alone computer, a server, a processing share of a datacenter, or an application running on some kind of shared hardware. More specifically, the entity 300 according to the present invention comprises processing resources 301 (e.g. CPU), memory resources 302 and communication means 303 (e.g. a receiver/transmitter working according to WLAN, WiFi, WiMAX, Bluetooth™, GPRS, GSM, PCS, DECT, UMTS, 3G/4G/5G, LTE, etc., or a wire-bound standards such as Ethernet and the like) that are configured to communicate with some kind of network 304 (e.g. LAN, wireless communication system, an intranet, the Internet, and the like).

Specifically, the memory resources 302 are adapted to store code that instructs the processing resources 301 during operation to implement at least a sending unit configured to send a request message to one of the plurality of servers for processing by the server; a receiving unit configured to receive a response message from the server receiving the request message; a storing unit configured to store from the response message received from said server information relating to an indicator for a processing load of said server; a selecting unit configured to select a server from said plurality of servers for sending a further request message to one of the plurality of servers. Further, the memory resources 302 are adapted to store code that instructs the processing resources 301 during operation to implement at least a receiving unit configured to receive, from the client entity, a request message for processing by the server; a computing unit configured to compute an indicator for a processing load of the server; an including unit configured to include information relating to said indicator into a response message; and a sending unit configured to send the response message to the client entity.

Although detailed embodiments have been described, these only serve to provide a better understanding of the invention defined by the independent claims and are not to be seen as limiting.

The invention claimed is:

1. A method for managing communication in a system comprising a client entity and a plurality of servers, wherein the client entity is configured to send request messages to one of the servers, and wherein the servers are configured to process a request message received from the client entity and send to the client entity a response message as a result of processing said request message, the method comprising the steps of:
   sending, by the client entity, a request message to each server of the plurality of servers for processing by each server;
   for each server of the plurality of servers:
      computing, by the server receiving the request message, an indicator that indicates a processing load of the server, and including information relating to said indicator into the response message;
      sending, by the server, the response message to the client entity; and
      storing, by the client entity, said information relating to said indicator;
   comparing, by the client entity, a plurality of indicators received from the plurality of servers; and
   selecting, by the client entity, a server from said plurality of servers for sending a further request message to the selected server,
   wherein an indicator received from the selected server indicates that the selected server has the least processing load among the plurality of servers,
   wherein said selecting is made at least on the basis of the stored information relating to one or more indicators for the processing load of one or more of the plurality of servers, and
   wherein the indicator is computed from a first information expressing a static processing capacity of the server.

2. The method of claim 1, wherein the indicator is further computed from a a second information expressing a current processing load of the server.

3. The method of claim 2, wherein the second information comprises information on an internal dynamic load of the server.

4. The method of claim 3, wherein the indicator comprises a numeric figure obtained by computing a ratio between a first numeric figure representing the first information and a second numeric figure representing the second information.

5. The method of claim 4, wherein the figure expressed by the indicator is obtained by further multiplying said ratio by a normalization factor.

6. The method of claim 4, wherein the step of selecting a server from said plurality of servers comprises selecting a server for which the stored information relates to, either, a lowest indicator figure, or a highest indicator figure.

7. The method of claim 1, wherein the selecting of a server from said plurality of servers is further based on stored information by the client entity indicating a static processing load of one or more servers.

8. A system comprising a client entity and a plurality of servers, wherein the client entity is configured to send request messages to the servers, and wherein the servers are configured to process a request message received from the client entity and send to the client entity a response message as a result of processing said request message, and wherein:
   the client entity is further configured to:
      send a request message to each server of the plurality of servers for processing by each server, to receive a response message from each server receiving the request message, to store said information relating to an indicator that indicates a processing load of the server, to compare a plurality of indicators received from the plurality of servers, and to select a server from said plurality of servers for sending a further request message to the selected server,
   wherein an indicator received from the selected server indicates that the selected server has the least processing load among the plurality of servers, and
   wherein the indicator is computed from a first information expressing a static processing capacity of the server,
   wherein said selection is made at least on the basis of the stored information relating to one or more indicators for the processing load of one or more of the plurality of servers; and
   the server is configured to receive, from the client entity, the request message for processing by the server, to compute said indicator, to include information relating to said indicator into the response message, and to send the response message to the client entity.

9. A client entity in a system comprising a plurality of servers, the client entity comprising:
   sending unit configured to send a request message to each server of the plurality of servers for processing by each server, wherein for each server of the plurality of servers, the server computes an indicator that indicates a processing load of the server, includes information relating to said indicator into a response message, and sends the response message to the client entity;

receiving unit configured to receive the response message from each server receiving the request message;

storing unit configured to store said information relating to an indicator that indicates a processing load of each server;

selecting unit configured to compare a plurality of indicators received from the plurality of servers, and select a server from said plurality of servers for sending a further request message to the selected server;

wherein said selection is made at least on the basis of comparing a plurality of indicators received from the plurality of servers and the stored information relating to one or more indicators for the processing load of one or more of the plurality of servers, wherein an indicator received from the selected server indicates that the selected server has the least processing load among the plurality of servers, and wherein the indicator is computed from a first information expressing a static processing capacity of the server.

10. A server in a system comprising a client entity and a plurality of servers, the server comprising:

receiving unit configured to receive, from the client entity, a request message for processing by the server;

computing unit configured to compute an indicator that indicates a processing load of the server;

including unit configured to include information relating to said indicator into a response message; and sending unit configured to send the response message to the client entity, wherein the server is selected from a plurality of servers for receiving further request message from the client entity, based at least on comparing a plurality of indicators received from the plurality of servers and determining that the indicator indicates that the server has the least processing load among the plurality of servers, and wherein the indicator is computed from a first information expressing a static processing capacity of the server.

11. A computer readable non-transitory storage medium storing a computer program which, when executed on at least one processor, causes the at least one processor to perform a method according to claim 1.

* * * * *